United States Patent [19]
Clarke

[11] 3,822,821
[45] July 9, 1974

[54] FRICTION WELDING APPARATUS

[75] Inventor: Donald Bernard Clarke, Birmingham, England

[73] Assignee: Joseph Lucus (Electrical) Limited, Birmingham, England

[22] Filed: Oct. 2, 1972

[21] Appl. No.: 294,297

[30] Foreign Application Priority Data
Oct. 2, 1971   Great Britain.................... 45948/71

[52] U.S. Cl.................................. 228/2, 29/470.3
[51] Int. Cl............................................ B23k 27/00
[58] Field of Search.......... 228/2; 29/470.3; 156/73, 156/580

[56] References Cited
UNITED STATES PATENTS

| | | | |
|---|---|---|---|
| 3,439,409 | 4/1969 | Bodine, Jr............................ | 228/2 X |
| 3,699,639 | 10/1972 | Ditto et al............................... | 228/2 |
| 3,705,678 | 12/1972 | Searle................................... | 156/73 |
| 3,725,998 | 4/1973 | Searle................................... | 29/470.3 |
| 3,732,613 | 5/1973 | Steigerwold........................ | 29/470.3 |

Primary Examiner—J. Spencer Overholser
Assistant Examiner—Robert J. Craig
Attorney, Agent, or Firm—Holman & Stern

[57] ABSTRACT

Friction welding apparatus includes a support, which, in use, carries a workpiece and a carrier member arranged to receive a component to be friction welded to the workpiece. In use, the component and the workpiece can be pressed against one another and the component can be moved with the carrier member relative to the support to allow the component to be friction welded to the workpiece. A drive member is provided for moving the carrier member relative to the support, the drive member also being capable of rotational movement relative to the carrier member about an axis of the drive member. A first cylindrical shaft is secured to the drive member so that the axis of the shaft is parallel with, but spaced from, the axis of rotation of the drive member. A second cylindrical shaft is mounted around the first shaft so that the axis of the first shaft is parallel with the axis of the second shaft, but is spaced from the axis of the second shaft by a distance equal to the space in between the axes of the first shaft and the drive member respectively. Drive can be supplied to the second shaft to rotate the second shaft and the first shaft is movable angularly relative to the second shaft between an inoperative position and a welding postion. In the welding position, the axis of the drive member is spaced from the axis of the second shaft so that rotational movement of the second shaft causes the drive member to move the carrier member relative to the support along a circular path centered on the axis of the second shaft. In the inoperative position, the axis of the second shaft and the axis of the drive member are co-extensive so that rotational movement of the second shaft rotates the drive member relative to the carrier member so that the carrier member is not moved relative to the support.

8 Claims, 4 Drawing Figures

PATENTED JUL 9 1974                    3,822,821

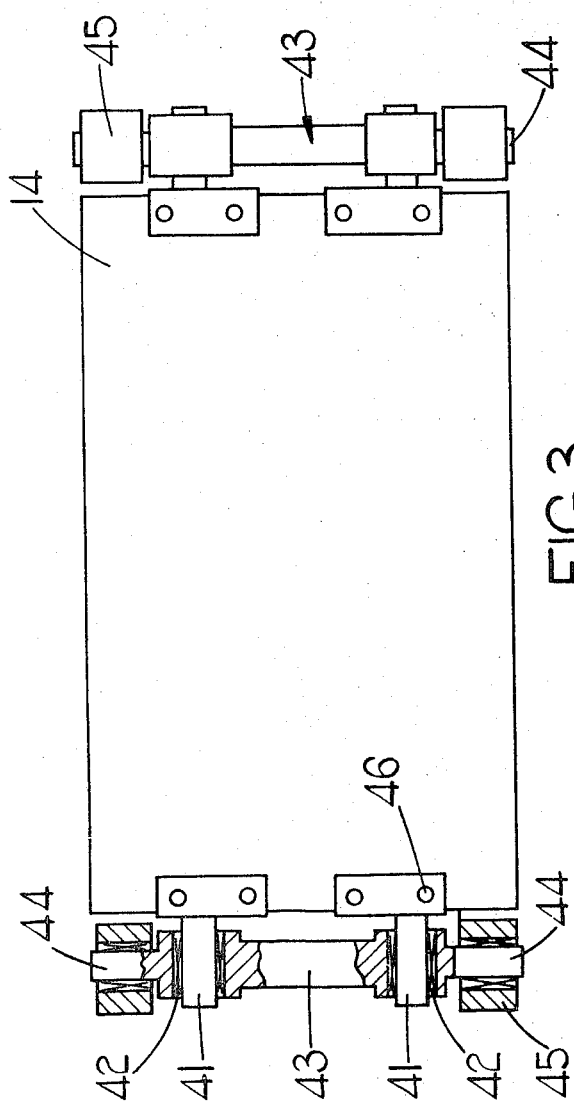
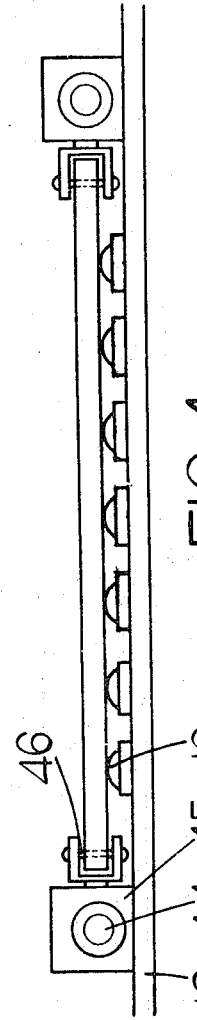
FIG.3.
FIG.4.

ns application no. 3,822,821

FRICTION WELDING APPARATUS

This invention relates to friction welding apparatus.

Apparatus, according to the invention, includes a support which, in use, carries a workpiece, a carrier member arranged to receive a component to be friction welded to the workpiece, the arrangement being such that, in use, the component and the workpiece can be pressed against one another and the component can be moved with the carrier member relative to the support to allow the component to be friction welded to the workpiece, a drive member for moving the carrier member relative to the support the drive member being capable of rotational movement relative to the carrier member about an axis of the drive member, a first cylindrical shaft secured to the drive member with the axis of said shaft being parallel with, but spaced from, said axis of rotation of the drive member, a second cylindrical shaft, the first shaft being mounted for angular movement in a bore in the second shaft so that the axis of the first shaft extends parallel with the axis of the second shaft, but is spaced from the axis of the second shaft by a distance equal to the spacing between the axes of the first shaft and the drive member respectively means for imparting rotational movement to said second shaft, and means for moving said first shaft angularly with respect to said second shaft between a welding position, in which the axis of the drive member is spaced from the axis of the second shaft and rotational movement of said second shaft causes said drive member to move said carrier member relative to the support along a circular path centred on the axis of said second shaft, and an inoperative position in which the axis of the second shaft and the axis of the drive member are co-extensive so that rotational movement of said second shaft rotates said drive member relative to said carrier member about said axis of the drive member and movement of said carrier member relative to the support is terminated.

Preferably, the apparatus also includes means for preventing rotational movement of said carrier member relative to said support during movement of said carrier member along said circular path.

Preferably, said means for imparting angular movement of the first shaft relative to the second shaft includes an externally screw-threaded third shaft secured to said first shaft and a collar in screw-threaded engagement with said third shaft, said collar being held in use, against angular movement relative to the second shaft and being movable along the axis of said third shaft to impart angular movement to said third shaft and thereby to said first shaft.

In the accompanying drawings,

FIG. 3 is a part sectional plan view of the carrier member of friction welding apparatus according to a modification of the first example of the invention, and FIG. 4 is a side view of the carrier member shown in FIG. 3.

Figure 1:
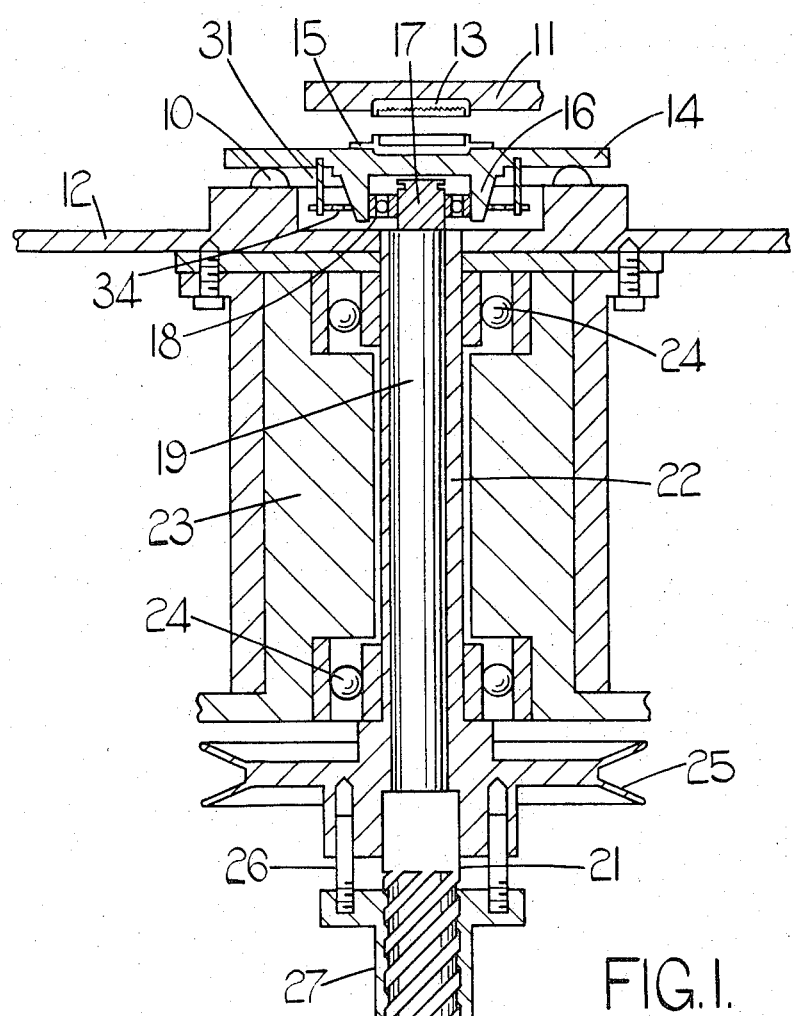
FIG. 1 is a sectional view of friction welding apparatus according to a first example of the invention.

Referring to the drawings, the apparatus includes a movable support 11 which is positioned above a fixed base 12 and which, in use, carries a workpiece 13 within a recess in the support. A carrier 14 is slidably mounted on the base 12 below the support 11 by means of a plurality of ball bearings 10 carried by the base 12 and is provided with a recess for receiving a component 15 to be friction welded to the workpiece 13. In use the support 11 is movable vertically relative to the base 12 from an inoperative position in which the workpiece 13 is spaced from the component 15 and an operative position in which the workpiece 13 engages the component 15. As will be appreciated from the ensuing description, when the workpiece 13 and component 15 are to be friction welded together, the arrangement of the apparatus is such that the workpiece 13 is held stationary relative to the support 11 whilst the component 15 is moved along an orbital path, without rotation, relative to the workpiece 13.

An integral, hollow boss extends downwardly from the surface of the carrier 14 presented to the base 12 and received within the boss is a cylindrical drive member 17. Roller bearings 18 are interposed between the drive member 17 and the inside surface of the boss 16 so that the drive member 17 is capable of angular movement relative to the boss 16 and carrier 14. Secured to the drive member 17 at its end remote from the carrier 14 is a first, cylindrical shaft 19 which extends through an aperture in the base 12 and has its axial parallel with, but spaced from, the axis of the drive member 17. At its end remote from the drive member 17, the shaft 19 is secured to a screw threaded shaft 21 and intermediate its ends is rotatably mounted in a hollow, second, cylindrical shaft 22. The shaft 22 is eccentrically bored so that the axis of the shaft 19 is parallel with the axis of the shaft 22 but is spaced therefrom by a distance equal to the distance between the axes of the shaft 19 and drive member 17 respectively.

The shaft 22 is rotatably mounted in a housing 23 by means of bearings 24 and at its end remote from the base 12 projects from the housing 23 and defines an integral pulley wheel 25. In use, a drive belt (not shown) extends around the pulley wheel 25 and is driven by an external motor (not shown) to impart rotational movement to the pulley wheel 25 and shaft 22. Slidably mounted in respective bores in the pulley wheel 25 are four pillars 26 which are secured to an internally screw-threaded collar 27. The collar 27 is in screw-threaded engagement with the shaft 21 and at its end remote from the pillars 26, is secured through a thrust bearing 29 to the piston 28 of a pneumatically operated piston and cylinder arrangement (not shown). Thus, by virtue of the pillars 26 being a sliding fit in their respective bores in the pulley wheel 25, the collar 27 is movable by the piston 28 axially along the shaft 21, although the pillars 26 prevent the collar 27 rotating about the shaft 22. Thus, during axial movement of the collar 27 along the shaft 21, the shaft 21 is moved angularly relative to the collar 27 and therefore the shaft 19 is moved angularly relative to the shaft 22. Further, when rotational movement is applied by the drive belt to the pulley wheel 25 the pillars 26, in preventing the collar 27 rotating about the shaft 22, couple the collar 27, the shaft 21, the shaft 19 and the drive member 17 for rotational movement with the pulley wheel 25 and the shaft 22.

Figure 2:
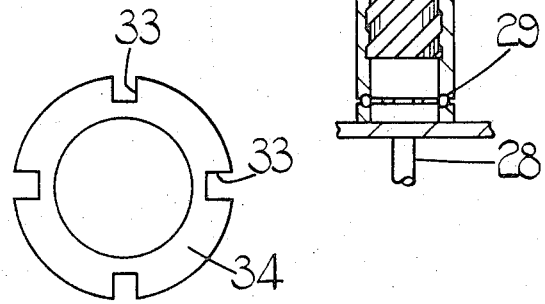
FIG. 2 is a plan view to a reduced scale of part of FIG. 1.

Secured to the carrier 14 so as to project downwardly from the surface thereof presented to the base 12 are a pair of pins 31 which are arranged diametrically opposite each other on a circle whose centre lies on the axis of the shaft 22. A further pair of pins (not shown) project vertically upwardly from part of the base 12 and are arranged diametrically opposite each other on the same circle as that of the pins 31, the two diameters extending at right angles to each other. The pins 31 and the further pair of pins extend into respective radially extending slots 33 formed in the periphery of a disc shaped element 34 (FIG. 2) which is loosely mounted around the boss 16. The pins and element 34 thus prevent rotation of the carrier 14 relative to the support 11 but allow the carriage to move relative to the support along an orbital path of limited radius.

In use, to effect a friction welding operation, the apparatus is first set so that the axis of the shaft 22 is aligned with the axis of the drive member 17. The pulley wheel 25 is then rotated by the drive belt to impart rotational movement to the shaft 22 and at this stage, since the axes of the shaft 22 and the drive member 17 are aligned, the drive member 17 merely rotates in the bearings 18 relative to the carrier 14 which thereby remains stationary. The component 15 is then engaged in the recess in the carrier 14 and the workpiece 13 is assembled onto the component in the required orientation relative to the component. The support 11 is then lowered until the workpiece 13 is located in the recess in the support, the latter being relieved to cater for any slight misalignment of the component, and until the workpiece applies a predetermined pressure to the component. The piston and cylinder arrangement is then operated so that the piston 28 moves the collar 27 axially along the shaft 21 by a predetermined distance and so displaces the axis of the drive member 17 relative to the axis of the shaft 22 in a direction perpendicular to the axis of the shaft 22. The drive member 17 then begins to move orbitally around the shaft 22 such that the axis of the member 17 moves in a circle of radius equal to the spacing between the axis of the member 17 and the axis of the shaft 22. Of course, the axial movement of the collar 27 along the shaft 21 is determined so that the radius of the orbital motion of the member 17 has the required value.

Orbital motion of the member 17 is transmitted to the carrier 14 and hence to the component 15 so as to move the component along a circular path centred on the axis of the shaft 22. However, since the carrier 14 is held against angular movement relative to the support 11, the component 15 remains in the same angular orientation with respect to the workpiece 13 as the component is moved orbitally relative to the workpiece. Friction, of course, opposes relative movement between the component 15 and workpiece 13 and the arrangement is such that the heat generated thereby is sufficient to melt the contacting surfaces of the component and the workpiece. Then after a predetermined time chosen so as to ensure that the contacting surfaces are molten, the collar 27 is again moved axially along the shaft 21 by such a distance that the resulting angular movement of the shaft 19 relative to the shaft 22 returns the axis of the member 17 into alignment with the axis of the shaft 22. During this angular movement of the shaft 19 relative to the shaft 22, the radius of the circular path described by the axis of the member 17, and hence the radius of the orbital movement performed by the carrier 14 and component 15, gradually decreases to zero. Thus, when the axes of the shaft 22 and member 17 respectively are again in alignment, the member 17 rotates in the bearings 18 relative to the carrier 14 so thaat relative movement between the components 15 and workpiece 13 terminates. The parts are then left in engagement until the molten, contacting surfaces thereof solidify to form a friction welded joint between the component and the workpiece, whereafter the welded assembly can be removed from the apparatus without stopping the drive to the shaft 22. In the particular example shown in the drawings the welded assembly produced by forming the component 15 and workpiece 13 is a reflector panel for a road vehicle.

Referring to FIGS. 3 and 4, in a modification of the first example the apparatus is similar to that described above, but now an alternative arrangement to the element 34 and its associated pins is provided to prevent rotation of the carriage 14 during orbital movement of the carrier 14. In this alternative arrangement, a pair of pegs 41, are secured to each of a pair of opposite sides of the carrier 14. Each peg 41 includes an integral U-shaped bracket and between the limbs of each bracket are secured to a pair of pins 46 which are slidably received within vertical bores in the carrier 14. The pins 46 thus allow limited vertical movement of the carrier 14 relative to the pegs 41, while preventing angular movement of the pegs relative to the carrier. The pegs 41 are arranged to extend parallel with one another and in a plane parallel with the base 12 of the apparatus and each pair of pegs 41 is slidably received in respective linear bearings 42 carried by a movable, bearing member 43. Thus, by virtue of the pegs 41 and bearings 42, the carrier 14 is movable over base 12. Further, since the pins 46 permit limited vertical movement of the carrier 14 relative to the pegs 41, any loading of the carrier during a welding operation is not transmitted to the bearings 42. Each bearing member 43 is provided with a pair of oppositely directed, elongated projections 44 which are arranged to extend parallel with the base 12, but perpendicular to the pegs 41. The projections 44 are slidably received in respect of linear bearings 45, carried by the base 12 and hence the carriage 14 is further movable in a second direction perpendicular to said first direction and parallel to the base 12. Thus it will be appreciated that, by virtue of the components 41, 42, 43, 44 and 45, the carrier 14 can be moved along an orbital path relative to the support 11, while being held against rotational movement relative to the support. Also it is to be appreciated that other alternative arrangements can be employed to provide the required movement of the carriage 14. For example the bearing members 43 could be interconnected to define a framework surrounding the carrier 14 and supporting the carrier for orbital movement relative to the support, while preventing the carrier from rotational movement relative to the support.

In a further modification (not shown) of the above example, the arrangement of the apparatus is such that, in use, to bring the workpiece 13 and component 15 into engagement with one another to effect a friction welding operation, the carrier 14 is moved vertically towards the support 11, which is fixed.

I claim:

1. Friction welding apparatus including a support which, in use, carries a workpiece, a carrier member arranged to receive a component to be friction welded to the workpiece, the arrangement being such that, in use, the component and the workpiece can be pressed against one another and the component can be moved with the carrier member relative to the support to allow the component to be friction welded to the workpiece, a drive member for moving the carrier member relative to the support, the drive member being capable of rotational movement relative to the carrier member about an axis of the drive member, a first cylindrical shaft secured to the drive member with the axis of said shaft being parallel with, but spaced from, said axis of rotation of the drive member, a second cylindrical shaft, the first shaft being mounted for angular movement in a bore in the second shaft so that the axis of the first shaft extends parallel with the axis of the second shaft, but is spaced from the axis of the second shaft by a distance equal to the spacing between the axes of the first shaft and the drive member respectively, means for imparting rotational movement to said second shaft, means for moving said first shaft angularly with respect to said second shaft between a welding position, in which the axis of the drive member is spaced from the axis of the second shaft and rotational movement of said second shaft causes said drive member to move said carrier member relative to the support along a circular path centred on the axis of said second shaft, and an inoperative position in which the axis of the second shaft and the axis of the drive member are co-extensive so that rotational movement of said second shaft rotates said drive member relative to said carrier member about said axis of the drive member and movement of said carrier relative to the support is terminated, a guide member associated with the carrier member, means constraining the carrier member to move linearly relative to the guide member in a first direction perpendicular to the axis of the second shaft and further means coupling the guide member to a fixed part of the apparatus so that the guide member is constrained to move relative to said fixed part in a second direction perpendicular to the axis of the second shaft and to said first direction, the guide member, the means constraining the carrier member and said further means thereby preventing rotational movement of the carrier member relative to said support during movement of the carrier member along said circular path.

2. Apparatus as claimed in claim 1 wherein the drive member is rotatably mounted in the carrier member.

3. Apparatus as claimed in claim 2 wherein the drive member is cylindrical and of circular cross section.

4. Apparatus as claimed in claim 1 wherein a rolling bearing is interposed between the carrier and the drive member to permit rotational movement of the drive member relative thereto about said axis of the drive member.

5. Apparatus as claimed in claim 1 wherein the guide member is provided with first and second elongated slots extending in said first and second directions respectively and first and second pins connected to the carrier member and said fixed part respectively extends into said first and second slots respectively so that each pin is capable of sliding movement relative to its slot.

6. Apparatus as claimed in claim 1 wherein said guide member includes a first linear bearing and a peg carried by the carrier member is slidably received in the bearing for movement in said first direction, and wherein a second linear bearing is carried by said fixed part of the apparatus and a portion of the guide member is slidably received in said second linear bearing for movement in the second direction.

7. Apparatus as claimed in claim 1 wherein said means for imparting angular movement of the first shaft relative to the second shaft includes an externally screw threaded third shaft secured to said first shaft and a collar in screw-threaded engagement with said third shaft, said collar being held, in use, against angular movement relative to the second shaft and being movable along the axis of said third shaft to impart angular movement to said third shaft and thereby to said first shaft.

8. Apparatus as claimed in claim 1 wherein the support is movable towards and away from the carrier member between an inoperative position, in which in use the workpiece is spaced from the component and an operative position, in which in use the workpiece engages the component and can be friction welded thereto.

* * * * *